United States Patent
Sone

(10) Patent No.: US 10,637,944 B2
(45) Date of Patent: Apr. 28, 2020

(54) INFORMATION-PROCESSING TERMINAL NOTIFYING USER ABOUT STATUS OF IMAGE-PROCESSING DEVICE

(71) Applicant: Brother Kogyo Kabushiki Kaisha, Nagoya-shi, Aichi-ken (JP)

(72) Inventor: Tatsuhiko Sone, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 88 days.

(21) Appl. No.: 15/203,106

(22) Filed: Jul. 6, 2016

(65) Prior Publication Data
US 2017/0094000 A1 Mar. 30, 2017

(30) Foreign Application Priority Data
Sep. 30, 2015 (JP) ................. 2015-193595

(51) Int. Cl.
*H04L 29/08* (2006.01)
(52) U.S. Cl.
CPC ............ *H04L 67/26* (2013.01); *H04L 67/025* (2013.01); *H04L 67/34* (2013.01)
(58) Field of Classification Search
CPC ........ H04L 67/26; H04L 67/025; H04L 67/34
See application file for complete search history.

(56) References Cited

U.S. PATENT DOCUMENTS 8,854,677 B2   10/2014 Oguma
9,710,152 B2 *  7/2017 Picon .................. G06F 3/0488
(Continued)

FOREIGN PATENT DOCUMENTS

JP   2006-163975 A   6/2006
JP   2008-054285 A   3/2008
(Continued)

OTHER PUBLICATIONS

Apr. 2, 2019—(JP) Notification of Reasons for Refusal—App 2015-193595, Eng Tran.

*Primary Examiner* — Brian J. Gillis
*Assistant Examiner* — Chhian (Amy) Ling
(74) *Attorney, Agent, or Firm* — Banner & Witcoff, Ltd.

(57) ABSTRACT

In an information-processing terminal, a controller is configured to perform: receiving an image-related command operation for instructing an image-processing device to execute an image-related operation via an operation interface; and transmitting image-related command information to the image-processing device via a communication interface in response to receiving the image-related command operation, the image-related command information instructing the image-processing device to execute the image-related operation. The controller is further configured to perform receiving a plurality of sets of status information from a server via the communication interface, each of the plurality of sets of status information being indicative of status of the image-processing device; and setting target status information from the plurality of sets of status information, the target status information being indicative of target status of the image-processing device to be notified to a user of the information-processing terminal; and displaying a status screen including the target status on the display.

9 Claims, 11 Drawing Sheets

(56) References Cited

U.S. PATENT DOCUMENTS

| | | | |
|---|---|---|---|
| 2004/0205260 A1* | 10/2004 | Oki | G06F 3/1204 710/8 |
| 2006/0092464 A1* | 5/2006 | Ataka | G06F 3/1204 358/1.15 |
| 2007/0291286 A1 | 12/2007 | Utsunomiya et al. | |
| 2009/0103124 A1* | 4/2009 | Kimura | G06F 3/1204 358/1.15 |
| 2010/0226662 A1 | 9/2010 | Takatani | |
| 2011/0022310 A1* | 1/2011 | Ishii | B60R 11/0258 701/532 |
| 2011/0063665 A1* | 3/2011 | Hirakawa | G06F 3/121 358/1.15 |
| 2013/0301071 A1* | 11/2013 | Kikuchi | G06F 3/1204 358/1.13 |
| 2014/0036309 A1 | 2/2014 | Oguma | |
| 2014/0059169 A1* | 2/2014 | Ko | H04W 8/24 709/217 |
| 2014/0211246 A1* | 7/2014 | Okuno | G06K 15/007 358/1.15 |
| 2014/0327930 A1 | 11/2014 | Hattori | |
| 2016/0087933 A1* | 3/2016 | Johnson | G06F 8/60 709/245 |
| 2016/0285987 A1* | 9/2016 | Huang | H04L 67/26 |
| 2017/0318286 A1* | 11/2017 | Yoshino | G09G 5/00 |
| 2018/0027091 A1* | 1/2018 | Agarwal | G06F 17/30867 709/217 |

FOREIGN PATENT DOCUMENTS

| | | |
|---|---|---|
| JP | 2010-201770 A | 9/2010 |
| JP | 2014-029641 A | 2/2014 |
| JP | 2014-219742 A | 11/2014 |
| JP | 2015-052894 A | 3/2015 |
| JP | 2015-103031 A | 6/2015 |

\* cited by examiner

FIG. 3

| DEVICE ID | JOB ID | DATE INFO | PRIORITY INFO | STATUS ID |
|---|---|---|---|---|
| MFP-A | 001 | 2015.09.06 10:20:42 | INFO | TRANSMITTING |
| MFP-A | 001 | 2015.09.06 10:21:15 | INFO | PRINTING(1/2) |
| MFP-A | 001 | 2015.09.06 10:22:07 | INFO | PRINTING(2/2) |
| MFP-A | — | 2015.09.06 10:22:24 | WARNING | PAPER JAM |
| MFP-A | 001 | 2015.09.06 10:22:25 | WARNING | PRINTING INTERRUPTED |
| MFP-A | 002 | 2015.09.06 10:23:38 | INFO | QUEUED |
| MFP-A | — | 2015.09.06 10:25:48 | INFO | PAPER JAM CLEARED |
| MFP-A | 001 | 2015.09.06 10:25:49 | INFO | PRINTING RESUMED(2/2) |
| MFP-A | 001 | 2015.09.06 10:26:03 | INFO | PRINTING SUCCESSFUL |

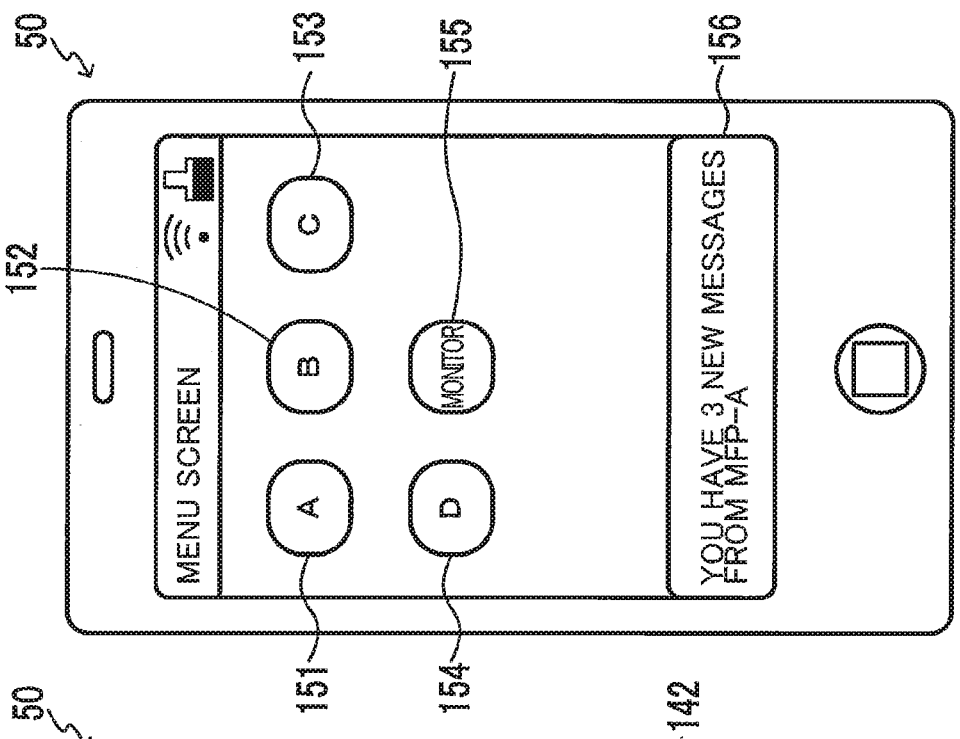
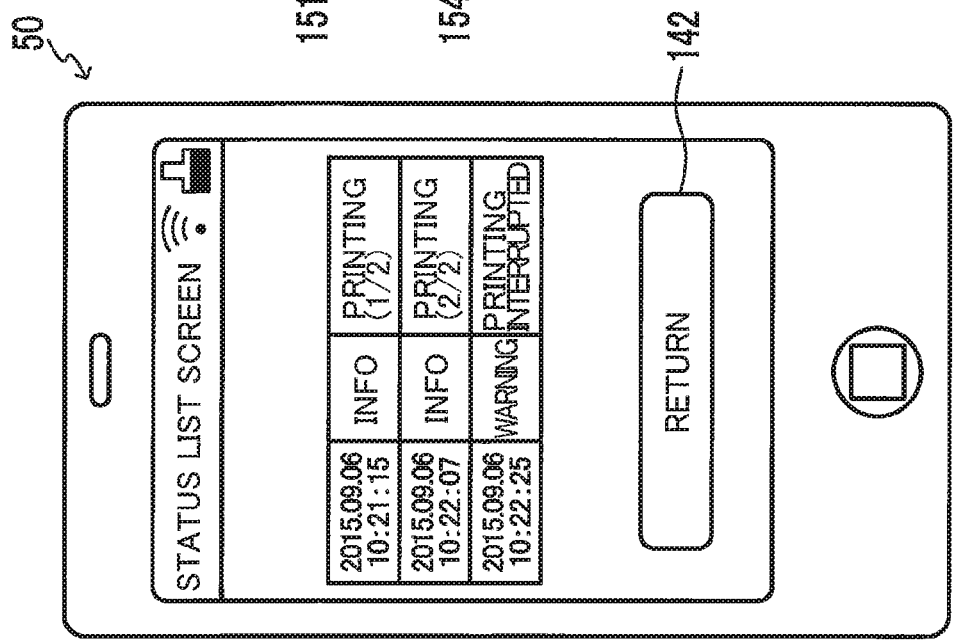

INFORMATION-PROCESSING TERMINAL NOTIFYING USER ABOUT STATUS OF IMAGE-PROCESSING DEVICE

CROSS REFERENCE TO RELATED APPLICATION

This application claims priority from Japanese Patent Application No. 2015-193595 filed on Sep. 30, 2015. The entire content of the priority application is incorporated herein by reference.

TECHNICAL FIELD

The present disclosure relates to an information-processing terminal, a system including the information-processing terminal and an image-processing device, and a non-transitory computer readable storage medium storing a set of program instructions for monitoring status of the image-processing device.

BACKGROUND

One system known in the art is configured of an image-processing device, a push notification server, and a portable terminal. The image-processing device generates event messages and transmits the event messages to the push notification server. The push notification server receives the event messages from the image-processing device and transmits the event messages to the portable terminal as push notifications. The portable terminal displays the event messages received in the push notifications. The event messages may also include status information indicating the status of the image-processing device, for example.

SUMMARY

A push notification server having the above construction may also store status information received from the image-processing device for such cases as when the server cannot communicate with the portable terminal. When communication with the portable terminal subsequently becomes possible, the push notification server then transmits the stored status information to the portable terminal as a push notification.

However, the user of the portable terminal may no longer require status information that has been stored on the push notification server for a long period of time. Further, when the push notification server has accumulated multiple records of status information, the corresponding multiple statuses will be displayed one after another on the portable terminal when communication becomes reestablished between the portable terminal and push notification server. Consequently, information needed by the user of the portable terminal may go unnoticed as it is buried among the other status notifications.

In view of the foregoing, it is an object of the disclosure to provide a monitoring program that is installed on an information-processing terminal receiving status information generated by an image-processing device via a server, and that is capable of suitably notifying the user of the information-processing terminal about the status of the image-processing device.

In order to attain the above and other objects, one aspect provides a non-transitory computer readable storage medium storing a set of program instructions for controlling an information-processing terminal. The information-processing terminal includes: a communication interface; an operation interface; a display; and a controller. The communication interface is configured to communicate with an image-processing device and a server. The operation interface is configured to receive a user operation. The image-processing device is configured to execute an image-related operation and transmit status information indicative of status of the image-processing device to the server. The program instructions, when executed by the controller, cause the information-processing terminal to perform: receiving an image-related command operation for instructing the image-processing device to execute the image-related operation via the operation interface; transmitting image-related command information to the image-processing device via the communication interface in response to receiving the image-related command operation, the image-related command information instructing the image-processing device to execute the image-related operation; receiving a plurality of sets of status information from the server via the communication interface; setting target status information from the plurality of sets of status information, the target status information being indicative of target status of the image-processing device to be notified to a user of the information-processing terminal; and displaying a status screen including the target status on the display.

According to another aspect, another aspect provides an information-processing terminal that includes: a communication interface; an operation interface; a display; and a controller. The communication interface is configured to communicate with an image-processing device and a server. The image-processing device is configured to execute an image-related operation and transmit status information indicative of status of the image-processing device to the server. The operation interface is configured to receive a user operation. The controller is configured to perform: receiving an image-related command operation for instructing the image-processing device to execute the image-related operation via the operation interface; transmitting image-related command information to the image-processing device via the communication interface in response to receiving the image-related command operation, the image-related command information instructing the image-processing device to execute the image-related operation; receiving a plurality of sets of status information from the server via the communication interface; setting target status information from the plurality of sets of status information, the target status information being indicative of target status of the image-processing device to be notified to a user of the information-processing terminal; and displaying a status screen including the target status on the display.

According to another aspect, another aspect provides a system that includes: an information-processing terminal; and an image-processing device. The image-processing device includes: a first communication interface; an image-processor; and a first controller. The first communication interface is configured to communicate with the information-processing terminal and a server. The first controller is configured to perform: receiving image-related command information from the information-processing terminal via the first communication interface; controlling the image-processor to execute an image-related operation according to the image-related command information; and transmitting status information indicative of status of the image-processing device to the server via the first communication interface. The information-processing terminal includes: a second communication interface; an operation interface; a display; and a second controller. The second communication interface is configured to communicate with the image-processing device and the server. The operation interface is configured to receive a user operation. The second controller is configured to perform: receiving an image-related command operation for instructing the image-processing device to execute an image-related operation via the operation interface; transmitting the image-related command information to the image-processing device via the first communication interface in response to receiving the image-related command operation; receiving a plurality of sets of status information from the server via the first communication interface; setting target status information from the plurality of sets of status information, the target status information being indicative of target status of the image-processing device to be notified to a user of the information-processing terminal; and displaying a status screen including the target status on the display.

BRIEF DESCRIPTION OF THE DRAWINGS

The particular features and advantages of the disclosure as well as other objects will become apparent from the following description taken in connection with the accompanying drawings, in which:

FIG. 3 shows an example of a status list stored in a data storage area of the portable terminal;

FIG. 11A shows an example of a status list screen displayed on the display of the portable terminal; and FIG. 11B shows an example of a menu screen displayed on the display of the portable terminal.

DETAILED DESCRIPTION

Figure 1:
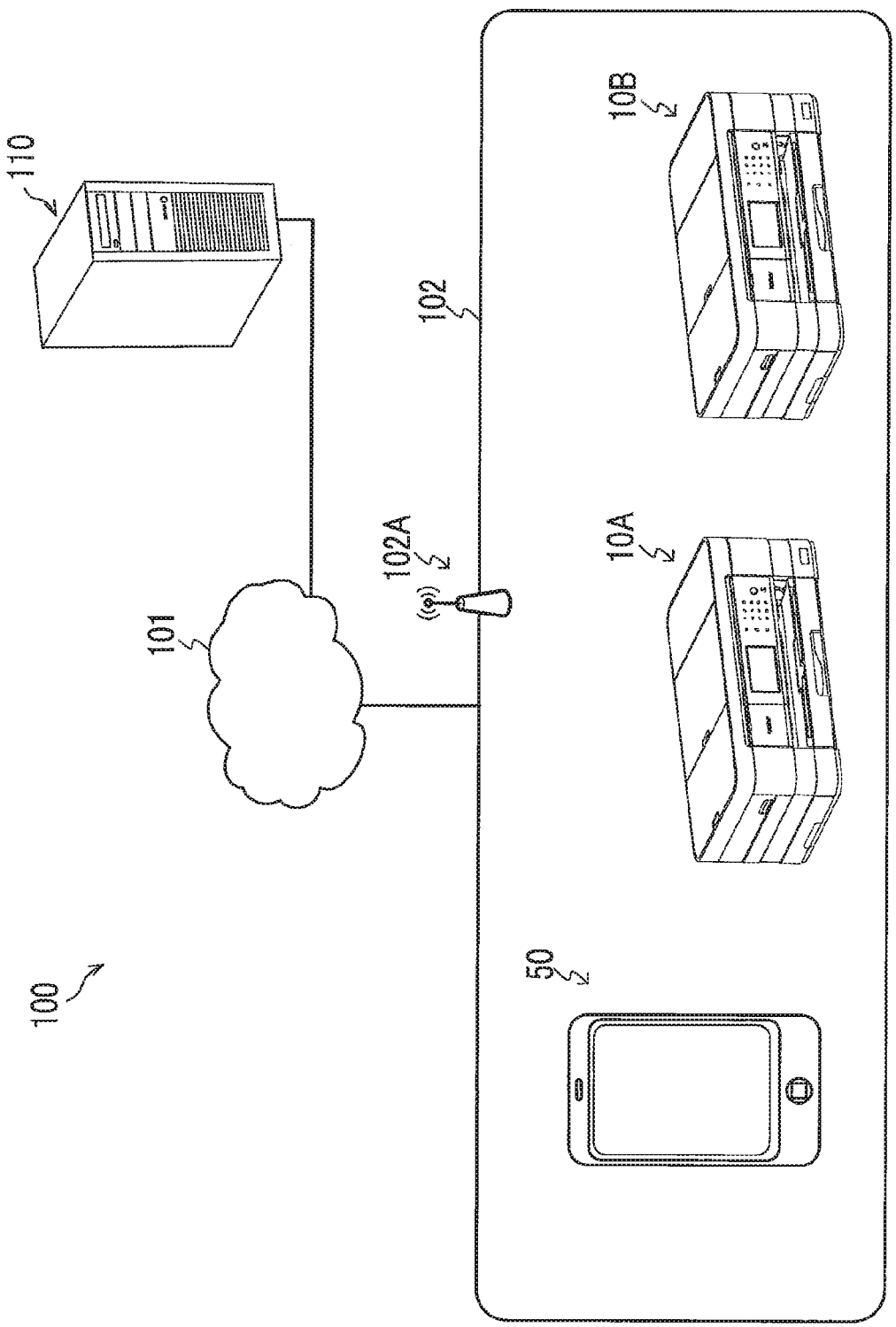
FIG. 1 is a schematic diagram showing a monitoring system according to a first embodiment of the present disclosure.

A system according to embodiments will be described while referring to the accompanying drawings wherein like parts and components are designated by the same reference numerals to avoid duplicating description. It would be apparent to those skilled in the art that various changes and modifications may be made therein without departing from the spirit and scope of the disclosure.

FIG. 1 is a schematic diagram showing a monitoring system 100 according to a first embodiment. The monitoring system shown in FIG. 1 includes two multifunction peripherals 10A and 10B (hereinafter also collectively referred to as "multifunction peripherals 10" or "multifunction peripheral 10"), and a portable terminal 50. The monitoring system 100 enables the portable terminal 50 to receive status information generated by the multifunction peripherals 10 via a server 110. The multifunction peripherals 10, portable terminal 50, and server 110 can communicate with each other over a communication network. While there are no particular limitations on the structure of the communication network, the network may include an internet 101, a wired local area network (LAN), a wireless LAN 102, or any combination of them.

The multifunction peripherals 10 and portable terminal 50 reside on the wireless LAN 102. Further, the wireless LAN 102 is connected to the internet 101 through a router 102A. The server 110 is also connected to the internet 101. The multifunction peripherals 10 and portable terminal 50 can communication with the server 110 on the internet 101 via the router 102A. Note that the multifunction peripherals 10 and portable terminal 50 may also reside on different communication networks.

Further, the multifunction peripherals 10 and portable terminal 50 may communicate with each other through a Near Field Communication (NFC), a TransferJet (registered trademark of TransferJet Consortium), a Bluetooth (trademark of Bluetooth SIG, Inc.), Bluetooth Low Energy (Bluetooth LE), or the like, instead of the wireless LAN. In addition, the multifunction peripherals 10 and portable terminal 50 may be connected to each other via USB cables. In this case, each of the multifunction peripherals 10 and portable terminal 50 has a communication interface for implementing communications compliant with the above-described standards or a connector to which the USB cable is connected, in addition to communication interfaces 25 and 55 described later.

[Multifunction Peripheral]

Figure 2A:
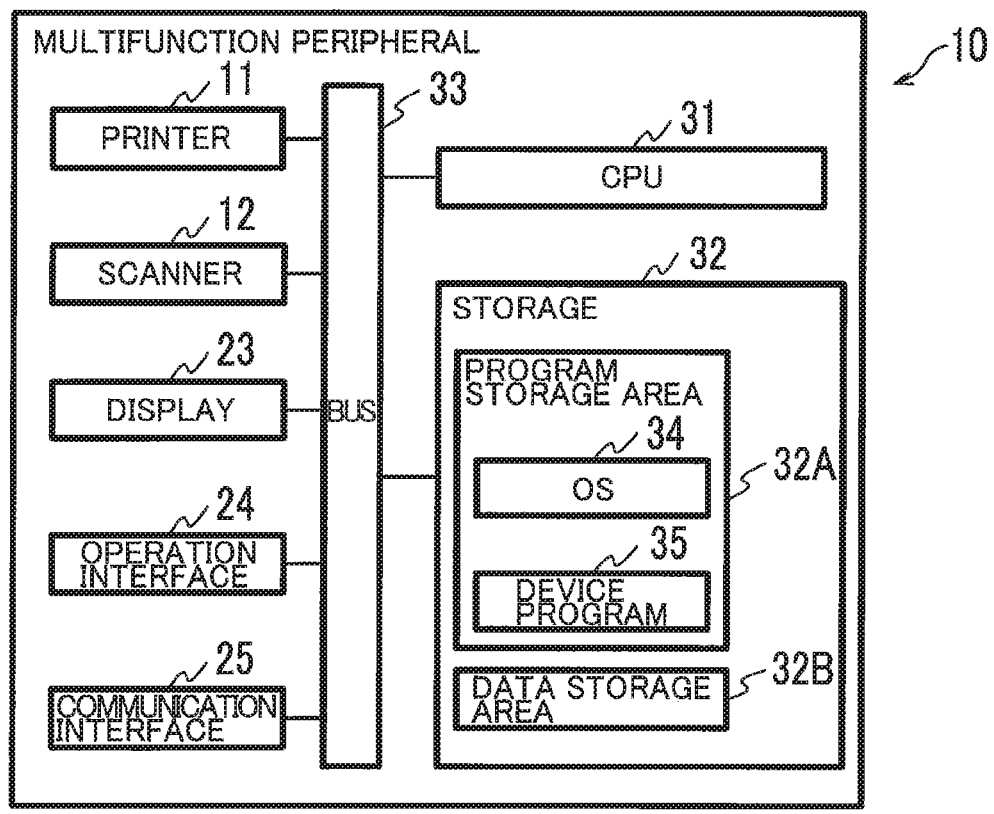
FIG. 2A is a block diagram of a multifunction peripheral.

As shown in FIG. 2A, the multifunction peripheral 10 primarily includes a printer 11, a scanner 12, a display 23, an operation interface 24, a communication interface 25, a central processing unit (CPU) 31, and a storage 32, all of which are interconnected via a communication bus 33. The multifunction peripheral 10 is an example of the claimed image-processing device. The printer 11 and scanner 12 are examples of the claimed image-processor that executes an image-related operation. The communication interface 25 is an example of the claimed first communication interface.

[Printer and Scanner]

The printer 11 executes a recording operation to record an image specified by image data on recording paper. The method of recording employed by the printer 11 may be any well-known method, including an inkjet method and electrophotographic method. The scanner executes a scanning operation to read an image recorded on recording paper and to generate image data. The multifunction peripheral 10 may further execute a facsimile operation to transmit and receive facsimile data and a copying operation to read an image recorded on recording paper and record the image on another sheet of recording paper. The printing operation, scanning operation, facsimile operation and copying operation are examples of the claimed image-related operation to form images.

[Display]

The display 23 includes a display screen for displaying various information. The display 23 may be configured of a liquid crystal display (LCD) or an organic electro-luminescence display (organic EL display), for example.

[Operation Interface]

The operation interface 24 receives operations from the user when the user selects objects displayed on the display screen of the display 23. More specifically, the operation interface 24 has buttons and outputs various operating signals to the CPU 31 corresponding to buttons that have been pressed by the user. The operation interface 24 may also include a film-like touch sensor laid over the display screen of the display 23. In other words, the display 23 may be configured as a touch screen. Note that the term "object" used in this description denotes an image that the user can select by operating the operation interface 24. The object is, for example, a character string, an icon, a button, and a link displayed on the display 23.

The operation interface 24 in the embodiments is implemented as a touchscreen that receives operations in the form of the user touching the display screen of the display 23. The operation interface 24 outputs position information indicating positions on the display screen that the user touched. The position information can be expressed as coordinates (x, y) in an x-y plane on which the display screen is located. The touch sensors of the operation interface 24 may be configured using any well-known method, including electrostatic capacitive method or an electrically resistive film method.

Note that the term "touch" in the following descriptions in general includes any operation for contacting the display screen with an input medium. In the embodiment, a tap operation in which the touching input medium is separated from the display screen within a prescribed time period is explained as an example of touching. However, examples of touching may include a long touch operation, a slide operation, a flick operation, a pinch-in operation, and a pinch-out operation. Further, the action of bringing the input medium to a position only slightly separated from the display screen may also fall under the concept of "touch" described above. Furthermore, the input medium may be the user's finger, a stylus, or the like.

[Communication Interface]

The communication interface 25 is an interface for implementing communications with external devices. More specifically, the communication interface 25 can communicate with the portable terminal 50 and server 110. The communication interface 25 uses a communication method that conforms to the IEEE 802.11 standard and Wi-Fi (registered trademark of Wi-Fi Alliance), for example.

[CPU]

The CPU 31 functions to control all operations of the multifunction peripheral 10. The CPU 31 acquires various programs described later from the storage 32 and executes the programs on the basis of various information outputted form the operation interface 24 and various information and the like acquired from external devices via the communication interface 25. The CPU 31 and storage 32 constitute an example of the claimed first controller.

[Storage]

The storage 32 has a program storage area 32A and a data storage area 32B. The program storage area 32A stores an operating system (OS) 34 and a device program 35. The OS 34 and the device program 35 are programs built in binary format. The device program 35 may be a single program or an aggregate of programs. The data storage area 32B stores data or information required to execute the device program 35.

Note that the terms "data" and "information" in the following descriptions used share aspects of being bits or bit strings that computers can handle. The computer treats "data" without considering the significance of its individual bits. In the case of "information," on the other hand, the computer's operations branch based on the significance of the individual bits. Additionally, a "command" is a control signal prompting the destination device to perform the next operation. A command may include information and may itself possess the properties of information.

Further, "data" and "information" are treated as the same data and information even when the format (such as a text format, binary format, or flag format) is modified for different computers, provided that the computers can recognize the same content. For example, information specifying the number "two" may be stored in one computer as information in the text format for the ASCII code "0x32", and may be stored in a different computer as information in the binary format for the binary notation "10".

However, the distinction between "data" and "information" is not strictly enforced; exceptions to the rule may be allowed. For example, data may be temporarily treated as information, while information may be temporarily treated as data. Further, certain bits or bit strings may be treated as data on one device and treated as information on another. Furthermore, information may be extracted from data, and data may be extracted from information.

The storage 32 is configured of a random access memory (RAM), a rea-only memory (ROM), an electrically erasable programmable read-only memory (EEPROM), a hard disk drive (HDD), a buffer provided in the CPU 31, or a combination of them, for example.

Note that the storage 32 may be any storage medium that can be read by a computer. A computer-readable storage medium is a non-transitory medium. In addition to the above examples, non-transitory media include a CD-ROM and a DVD-ROM. A non-transitory medium is also a tangible medium. On the other hand, electric signals that convey programs downloaded from a server or the like on the internet are a computer-readable signal medium, which is one type of computer-readable medium but is not considered a non-transitory computer-readable storage medium.

The CPU 31 executes programs stored in the program storage area 32A. However, in the following descriptions may omit the CPU 31 when describing operations of the programs. In other words, the phrasing "Program A executes Process A" in the following description may be used to signify that "the CPU 31 executes Process A described in Program A."

The programs stored in the program storage area 32A determine the results of events and execute operations based on these results. However, this specification will omit a description of such determinations and will merely describe the operations of each program. Thus, the expression in the following description "Program executes Process A in response to Condition A" will be used to denote the meaning "Program determines whether Condition A has been met and executes Process A in response to a positive determination."

Further, the programs stored in the program storage area 32A identify, extract, or select data and the like. Here, the identification of data and the like denotes a process in which the program identifies data from a plurality of data sets that matches a condition, and stores the data and the like itself or information identifying the data and the like in a predetermined storage area. Here, information identifying data and the like may be identification information for identifying the data and the like, an index of an array in which the data and the like is stored, or a pointer for a storage area in which the data and the like are stored, for example. The programs perform similar processes for extracting or selecting data and the like.

Further, the programs stored in the program storage area 32A acquire data and the like. For example, the acquisition of data and the like may denote a process in which a program reads data from the storage area in which the data is stored; a process in which the program receives data transmitted from an external device; a process in which the program requests the transmission of data from an external device and receives the data transmitted from the external device; a process in which the program receives data outputted from the OS or other program; or a process in which the program requests the output of data from another program and receives the data outputted from the other program.

The OS 34 is the underlying software that provides an application programming interface (API) for controlling the hardware constituting the multifunction peripheral 10, including the printer 11, scanner 12, display 23, operation interface 24, and communication interface 25. Hence, the programs described above control the hardware of the multifunction peripheral 10 by calling the API provided in the OS 34. However, the role of the OS 34 will not be included in a description of operations performed by the programs in this specification. Thus, the phrase "Program B controls Hardware C" in the following description may be used to signify that "Program B controls Hardware C through the API of the OS 34."

Note that the above description for basic operations of programs is similarly applicable to programs stored in a program storage area 62 A on the portable terminal 50 described later and is not merely limited to programs stored in the program storage area 32A.

[Portable Terminal]

Figure 2B:
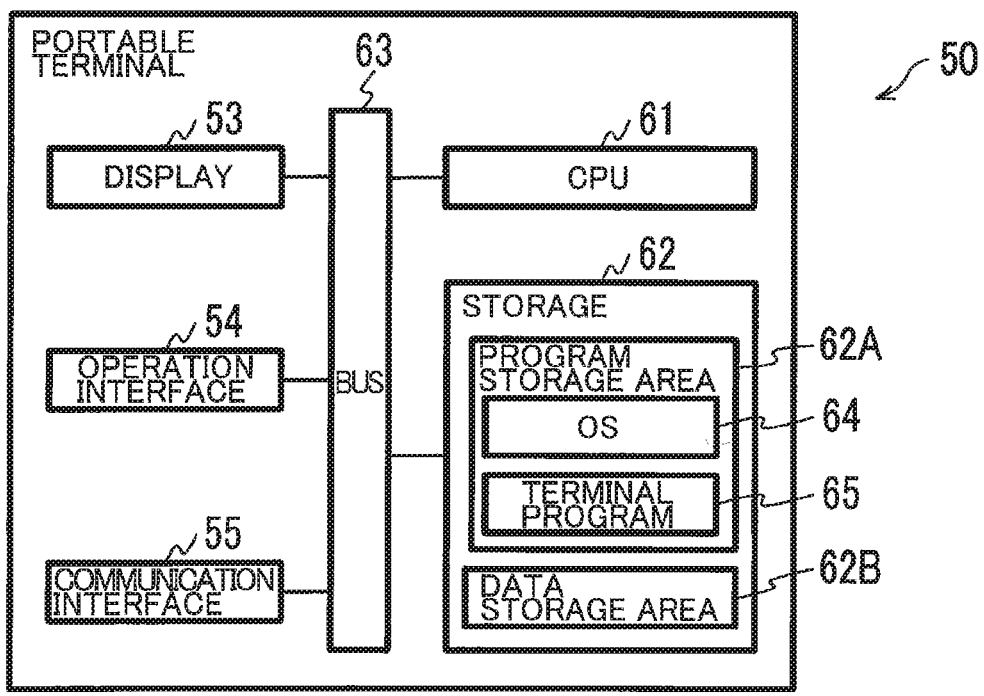
FIG. 2B is a block diagram of a portable terminal.

As shown in FIG. 2B, the portable terminal 50 primarily includes a display 53, an operation interface 54, a communication interface 55, a CPU 61, a storage 62, and a communication bus 63. Since the display 53, operation interface 54, communication interface 55, CPU 61, storage 62, and communication bus 63 in the portable terminal 50 share the same essential form as the corresponding display 23, communication interface 25, CPU 31, storage 32 and communication bus 33 in the multifunction peripheral 10, a description of these components will not be repeated.

The portable terminal 50 is an example of the claimed information-processing terminal. The data processor may be a mobile phone, smartphone, tablet device, or personal computer (PC), for example. The CPU 61 and storage 62 constitutes an example of the claimed controller and second controller.

The program storage area 62A stores an OS 64, and a terminal program 65 as an example of the claimed program instructions. The OS 64 may be a mobile operating system such as Android (registered trademark of Google Inc.), iOS (registered trademark of Cisco Systems, Inc.), or Windows Phone (registered trademark of Microsoft Corporation), for example. The OS 64 can execute a plurality of programs installed on the portable terminal 50 concurrently. The programs are executed so as to be virtually simultaneous through a method such as time division multiplexing.

Of the plurality of programs executed in parallel, the OS 64 executes one program in the foreground and the other programs in the background. Foreground execution is a state in which the screen produced by the program is displayed on the display 53, for example. Background execution is a state in which the screen produced by a program other than the program executing in the background is displayed on the display 53, for example. Hence, only the screen for the program being executed in the foreground is displayed on the display 53.

The terminal program 65 has a user interface through which the user can specify conditions for the execution of an image-related operation (e.g., select what image data to print or specify the reading resolution for a scanning operation) and can control a multifunction peripheral 10 to execute an image-related operation based on commands received via the user interface. The present embodiment will describe a process in which the user is prompted to specify image data to be printed and the multifunction peripheral 10A is directed to execute a printing operation on the specified image data. The terminal program 65 can also receive status information from the server 110 and can notify the user regarding the status of the multifunction peripheral 10 specified in this status information. The embodiments will describe a process in which the status of the multifunction peripheral 10A is displayed on the display 53 of the portable terminal 50 while the multifunction peripheral 10A is executing a printing operation.

As shown in FIG. 3, the data storage area 62B can store associations among device IDs, job IDs, date information, priority information, and status IDs. Hereinafter, the information shown in FIG. 3 will be collectively called the "status list," while individual records in the status list will be called "status records." The status list may include a plurality of status records. Status records are added to and deleted from the status list by the terminal program 65. The status information that the terminal program 65 receives from the server 110 includes various information contained in the status records.

The device ID is an example of the claimed device identification information used to identify each multifunction peripheral 10. In the present embodiment, the multifunction peripheral 10A is identified by the device ID "MFP-A," and the multifunction peripheral 10B is identified by the device ID "MFP-B." The job ID is an example of the claimed operation identification information used to identify image-related operations performed on the multifunction peripheral 10. More specifically, the portable terminal 50 issues a job ID when transmitting image-related command information described later. The date information specifies the date and time that the multifunction peripheral 10 generated the status information, the date and time that the server 110 received the status information from the multifunction peripheral 10, or the date and time that the server 110 transmitted the status information to the portable terminal 50.

The priority information specifies the importance of the status specified by the status information. Priority information may be pre-associated with each status ID. The priority information in the first embodiment may "Info" or "Warning," where "Warning" has a higher priority level than "Info." In the first embodiment, the priority information "Warning" is attached to suspension status information described later, while the priority information "Info" is attached to all other status information. However, the present disclosure is not limited to these two levels of priority. The priority information may include other levels, such as "Caution," "Alert," and the like. The status ID is information specifying the status of a multifunction peripheral 10. In FIG. 3, the status ID is expressed in character strings such as "PRINTING (1/2)," "PAPER JAM," and the like, but any form of information corresponding to such character strings may be used.

While not shown in the drawings, the data storage area 62B can also store a designated device ID. The designated device ID is a device ID for one of the multifunction peripherals 10A and 10B that can communicate with the portable terminal 50. Hereinafter, the multifunction peripheral 10 identified by the designated device ID will be called the "designated device." In the first embodiment, it will be assumed that the device ID "MFP-A" is stored in the data storage area 62B as the designated device ID.

While not shown in the drawings, the data storage area 62B stores the terminal ID "abc" identifying the portable terminal 50. The terminal ID is an example of terminal identification information that the server 110 uses to identify the portable terminal 50. The data storage area 62B may also be provided with a data folder. The data folder may be used to store photograph data, document data, presentation data, spreadsheet data, and the like.

[Server]

The server 110 receives status information from multifunction peripherals 10 and transmits the status information to the portable terminal 50. The server 110 is a push notification server that provides status information to the portable terminal 50 in the form of push notifications.

[Operations of Monitoring System]

Figure 4:
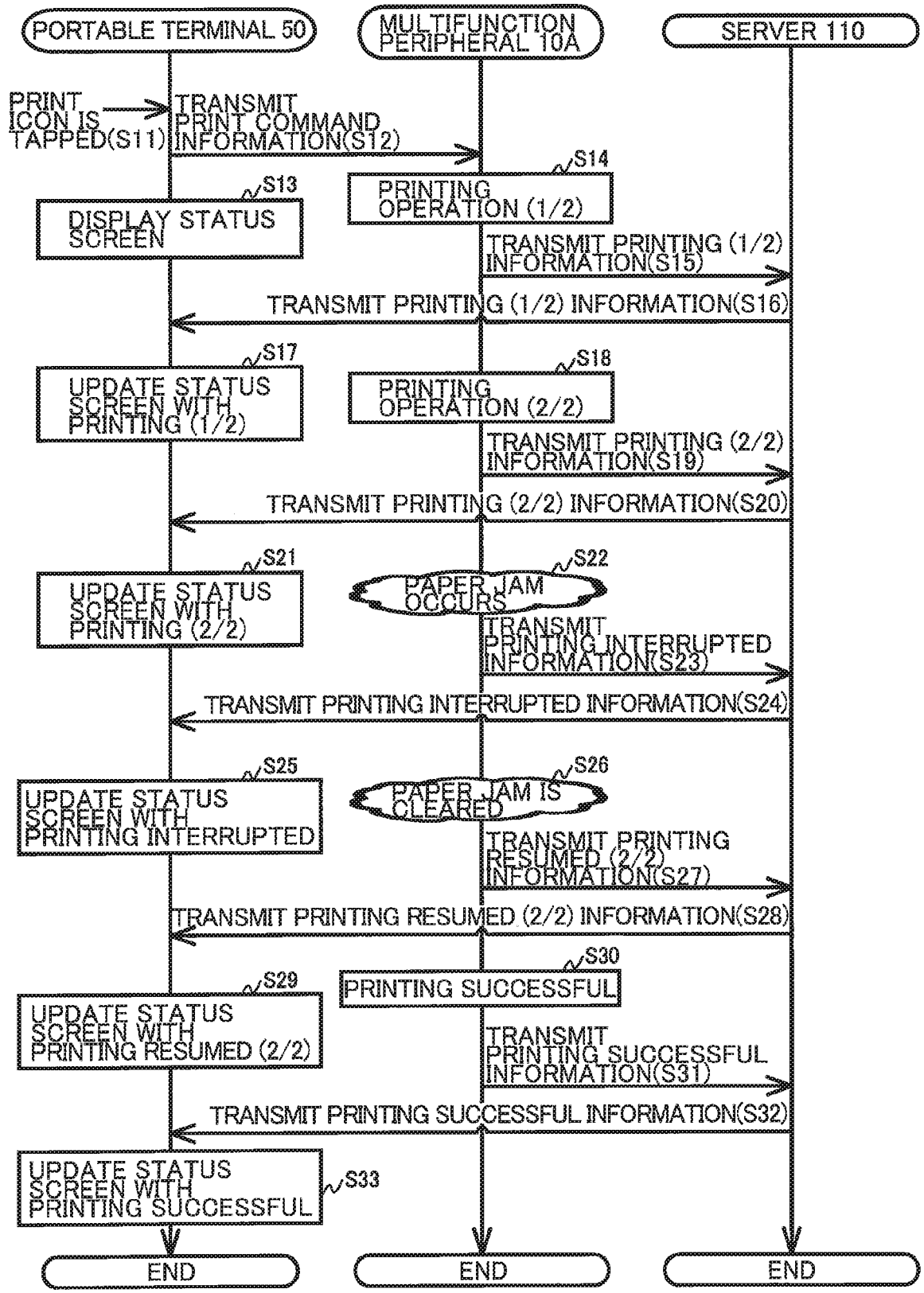
FIG. 4 is a sequence chart illustrating steps for a process executed by the portable terminal, the multifunction peripheral, and a server in which the portable terminal directs the multifunction peripheral to execute a printing operation.

Next, the operations of the monitoring system 100 according to the first embodiment will be described with reference to FIGS. 4 through 6. In a process performed by the monitoring system 100 according to the first embodiment, the multifunction peripheral 10 executes a printing operation in response to a command from the portable terminal 50, the portable terminal 50 receives status information through the server 110 regarding the multifunction peripheral 10 executing the printing operation, and the portable terminal 50 displays the status indicated in this status information on the display 53.

Figure 8A:
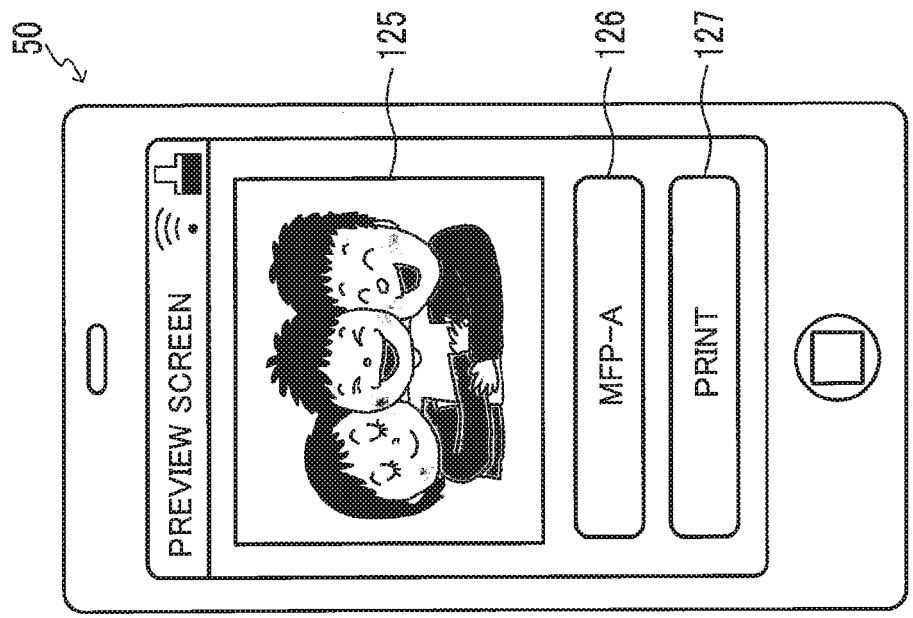
FIG. 8A shows an example of a data selection screen displayed on a display of the portable terminal.

The OS 64 of the portable terminal 50 starts the terminal program 65 when an operation to select a program icon 155 displayed in a menu screen, such as that shown in FIG. 11B, is received via the operation interface 54. The OS 64 executes the terminal program 65 in the foreground. While running in the foreground, the terminal program 65 performs the printing process shown in FIG. 5. In S41 at the beginning of the printing process, the terminal program 65 displays a data selection screen on the display 53. FIG. 8A shows an example of the data selection screen. The data selection screen shown in FIG. 8A includes a plurality of data icons 121, 122, and 123. Each of the data icons 121, 122, and 123 corresponds to data of a different type stored in the data folder, for example.

In S42 the terminal program 65 determines whether an operation was received via the operation interface 54 to select an icon in the data selection screen, and repeatedly performs this determination while a selection has not been made (S42: NO). During this time, the terminal program 65 maintains the display of the data selection screen on the display 53. When the terminal program 65 receives an operation via the operation interface 54 selecting one of the data icons 121, 122, and 123 (S42: YES), the terminal program 65 sets the data corresponding to the selected data icon as the designated data. For example, if the data icon 121 was selected, the terminal program 65 sets the data "PHOTO.JPEG" corresponding to the data icon 121 as the designated data.

Figure 8B:
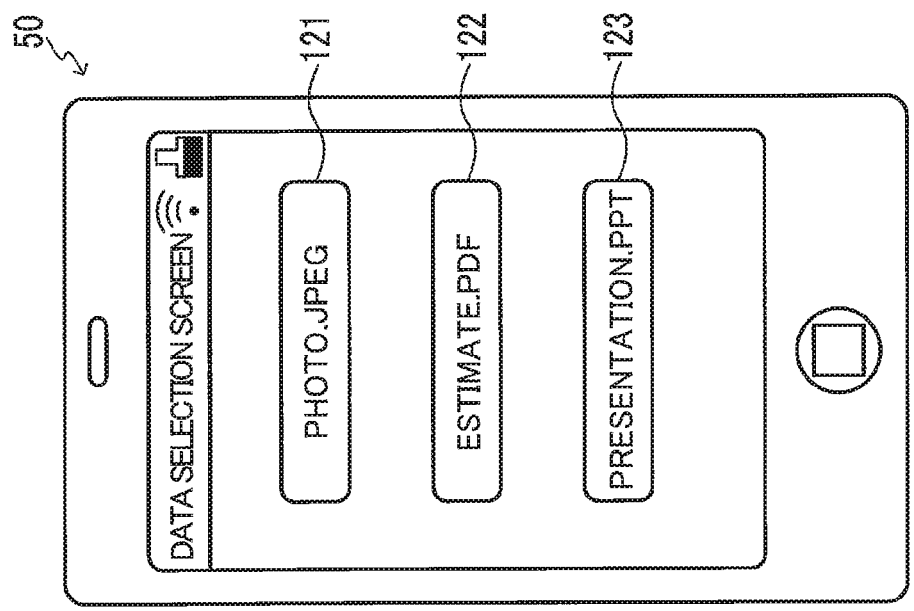
FIG. 8B shows an example of a preview screen displayed on the display of the portable terminal.

In S43 the terminal program 65 displays a preview screen on the display 53. FIG. 8B shows an example of the preview screen. The preview screen shown in FIG. 8B includes a preview image 125, a device icon 126, and a "PRINT" icon 127. In S44 the terminal program 65 determines whether a user operation was received via the operation interface 54 for selecting one of the icons in the preview screen.

The preview image 125 is an image showing the outcome of the designated device executing a printing operation on the designated data. The preview image 125 in this example shows the outcome of the multifunction peripheral 10A recording the image designated by the data "PHOTO.JPEG" on recording paper. The device icon 126 corresponds to a command for changing the designated device. In this example, the designated device ID "MFP-A" stored in the data storage area 62B is displayed in the device icon 126. The "PRINT" icon 127 corresponds to a command to the designated device to execute a printing operation on the designated data.

Figure 9A:
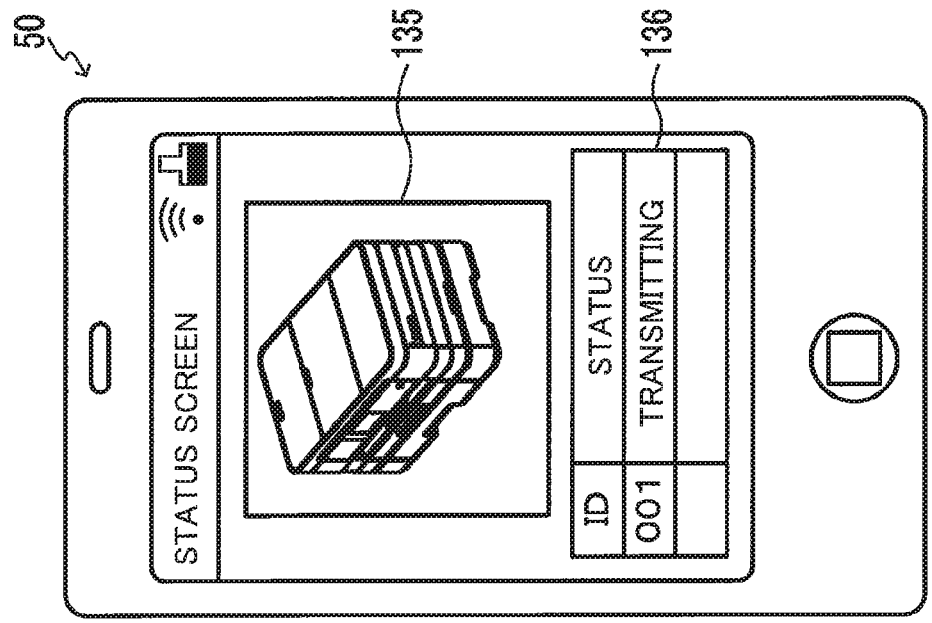
FIG. 9A shows an example of a device selection screen displayed on the display of the portable terminal.

When the terminal program 65 receives an operation via the operation interface 54 selecting the device icon 126 (S44: DEVICE ICON), in S54 the terminal program 65 displays a device selection screen on the display 53. FIG. 9A shows an example of the device selection screen. The device selection screen shown in FIG. 9A includes device icons 131 and 132. In S55 the terminal program 65 determines whether a user operation was received via the operation interface 54 selecting one of the icons in the device selection screen.

The device icons 131 and 132 correspond to the two multifunction peripherals 10 with which the portable terminal 50 can communicate. Specifically, the terminal program 65 uses the Simple Network Management Protocol (SNMP), for example, to find multifunction peripherals 10 that the portable terminal 50 can communicate with via the communication interface 55. Thus, the device selection screen that the terminal program 65 displays on the display 53 includes the device icons 131 and 132 corresponding to the multifunction peripherals 10 detected through SNMP. The device ID for each multifunction peripheral 10 is included in each of the corresponding device icons 131 and 132. In the present example, it will be assumed that the multifunction peripherals 10A and 10B were detected.

When the terminal program 65 receives an operation via the operation interface 54 selecting one of the device icons (S55: YES), in S56 the terminal program 65 stores the device ID corresponding to the selected device icon in the data storage area 62B as the designated device ID. For example, when the device icon 132 is selected, the terminal program 65 stores the device ID "MFP-B" corresponding to the device icon 132 in the data storage area 62B as the designated device ID. If a designated device ID is already stored in the data storage area 62B, the terminal program 65 overwrites this device ID with the new designated device ID. Subsequently, the terminal program 65 returns to S43 and repeats the process described above. The following description will assume that the designated device ID was not modified.

When the terminal program 65 receives an operation via the operation interface 54 selecting the "PRINT" icon 127 in the preview screen (S44: PRINT ICON), in S45 the terminal program 65 adds a status record to the status list. More specifically, the terminal program 65 issues a job ID, such as "001," and adds a status record to the status list that includes the designated device ID "MFP-A," the newly issued job ID "001," date information specifying the current time "9/6/2015 10:20:42," the priority information "Info," and the status ID "TRANSMITTING."

In S46 the terminal program 65 transmits print command information to the designated device, i.e., the multifunction peripheral 10A in this example, via the communication interface 55. The print command information is information necessary for executing a printing operation based on the designated data. For example, print command information may include the designated data "PHOTO.JPEG," the job ID "001," and the terminal ID "abc." The print command information may further include print settings information, such as the paper size (3R, for example) and number of copies (2 copies, for example). The print command information is an example of the claimed image-related command information to instruct the designated device to execute the image-related operation. The user operation for selecting the "PRINT" icon 127 via the operation interface 54 is an example of the claimed image-related command operation.

Figure 9B:
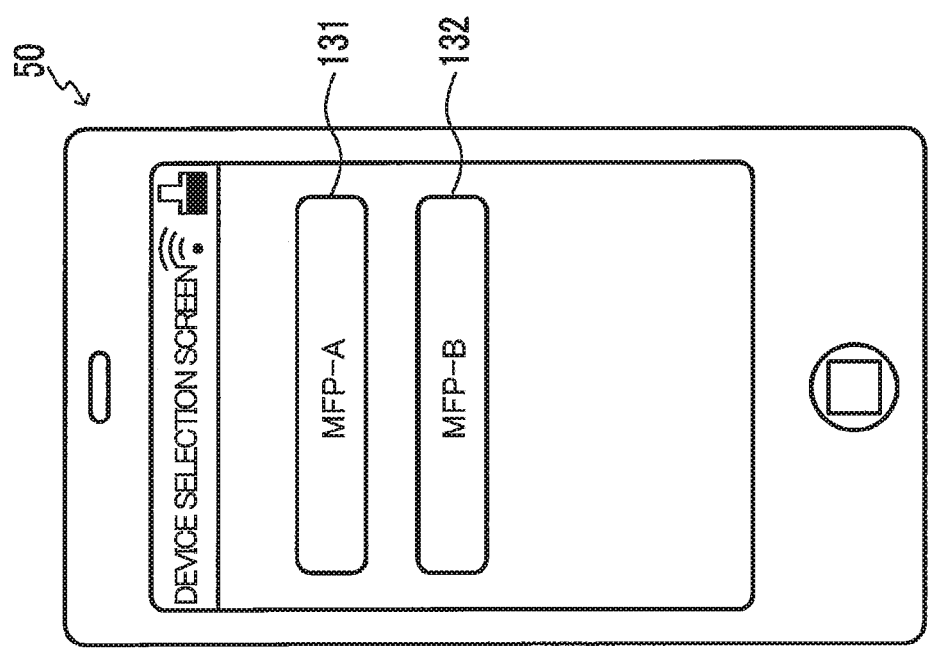
FIG. 9B shows an example of a status screen displayed on the display of the portable terminal.

In S47 the terminal program 65 displays a status screen on the display 53. FIG. 9B shows an example of the status screen. The status screen shown in FIG. 9B includes a device status display area 135, and an operation status display area 136. The device status display area 135 is an area of the status screen for displaying the device status specified in device status information described later. The operation status display area 136 is an area of the status screen for displaying the operation status specified by operation status information described later.

The first time that step S47 is executed in the printing process, the terminal program 65 displays the status specified in the status record that was added to the status list in S45 in the operation status display area 136. In the example of FIG. 9B, the operation status display area 136 includes the job ID "001" and the status "TRANSMITTING," but the information displayed in the operation status display area 136 is not limited to this example.

In the meantime, though not shown in the flowchart, the device program 35 of the multifunction peripheral 10A receives print command information from the portable terminal 50 via the communication interface 25. The device program 35 directs the printer 11 to execute a printing operation based on this print command information. Thus, the printer 11 records the photograph specified in the data "PHOTO.JPEG" included in the print command information on two sheets of L-type recording paper. The device program 35 also temporarily stores the job ID "001" and terminal ID "abc" included in the print command information in the data storage area 32B. The device program 35 also generates status information at prescribed timings during the printing operation and transmits the generated status information to the server 110 via the communication interface 25. The status information generated by the multifunction peripheral 10 includes operation status information and device status information.

Operation status information indicates the status of an image-related operation being executed according to the image-related command information received from the portable terminal 50. As shown in FIG. 3, the operation status for the printing operation in this example may be "PRINTING (1/2)" indicating that an image is currently being recorded on the first of two pages, "PRINTING (2/2)" indicating that an image is currently being recorded on the second of two pages, "PRINTING INTERRUPTED" indicating the printing operation was suspended, "PRINTING RESUMED (2/2)" indicating that an interrupted printing operation was restarted, "PRINTING SUCCESSFUL" indicating that the printing operation was successfully completed, and "QUEUED" indicating that the printing operation is on standby until earlier printing operations are completed, for example.

Device status information indicates the status of the multifunction peripheral 10. The device status is common among a plurality of image-related operations executed on the multifunction peripheral 10 and does not correspond one-on-one to image-related operations. As shown in FIG. 3, the device status may be "PAPER JAM," indicating that recording paper has become jammed along the conveying path; and "PAPER JAM CLEARED," indicating that the jammed recording paper has been removed from the conveying path, for example.

While not shown in FIG. 3, the device status may be set to other statuses, such as "OUT OF PAPER," indicating that the multifunction peripheral 10 has run out of recording paper; or "OUT OF INK," indicating that an ink cartridge mounted in the printer 11 has run out of ink. The methods of detecting these device statuses are well known in the art and will not be described here. Further, the device status information may be set to a value that does not include the job ID or that is not used as the job ID (−1, for example).

The status information described above that includes one of the status IDs "PRINTING INTERRUPTED" and "PAPER JAM" is an example of the claimed suspension status information indicating that the image-related operation has been suspended. Status information that includes the status ID "PRINTING RESUMED (2/2)" and "PAPER JAM CLEARED" is an example of the claimed resumption status information indicating that the image-related operation has been resumed. Further, the suspension status information that includes the status ID "PRINTING INTERRUPTED" is correlated with the resumption status information that includes the status ID "PRINTING RESUMED (2/2)." Similarly, suspension status information that includes the status ID "PRINTING JAM" is correlated with the resumption status information that includes the status ID "PRINTING JAM CLEARED." Additionally, the resumption status information may include information for identifying the corresponding suspension status information.

In S48 of FIG. 5, the terminal program 65 of the portable terminal 50 determines whether an operation has been received via the operation interface 54 selecting a "!" icon 141 described later. The process in step S48 will be described later with reference to FIG. 10B. If the "!" icon 141 is not displayed in the status screen or the "!" icon 141 has not been selected (S48: NO), in S49 the terminal program 65 determines whether the operation status "PRINTING SUCCESSFUL" has been displayed in the status screen. If the operation status "PRINTING SUCCESSFUL" has been displayed (S49: YES), in S50 the terminal program 65 deletes the status record that includes the job ID "001" from the status list after a prescribed display time has elapsed, and subsequently ends the printing process.

However, if the operation status "PRINTING SUCCESSFUL" has not been displayed (S49: NO), in S52 the terminal program 65 waits until new status information has been received from the server 110. More specifically, the terminal program 65 transmits transmission request information to the server 110 via the communication interface 55. Transmission request information is information requesting the server 110 to transmit status information. The transmission request information includes the terminal ID "abc" of the portable terminal 50.

The terminal program 65 subsequently receives status information from the server 110 via the communication interface 55 in response to the just-transmitted transmission request information (S52: YES). The terminal program 65 also retransmits transmission request information to the server 110 via the communication interface 55 after receiving the status information or a prescribed time after transmitting the transmission request information.

Upon receiving the status information from the server 110, the terminal program 65 adds a status record based on the received status information to the status list, and in S53 executes a status setting process. The status setting process is a process for setting target status information designating what status information received from the server 110 should be issued as a notification to the user of the portable terminal 50. The status setting process will be described later in greater detail. Here, the most recently received status information is set as the target status information.

After completing the status setting process of S53, the terminal program 65 returns to S47 and displays a status screen on the display 53 that includes the status specified in the target status information set in the status setting process. The terminal program 65 then repeats the process from S47 to S53 until operation status information including the status ID "PRINTING SUCCESSFUL" is received from the server. Hence, the terminal program 65 continues to display the status screen while updating the status displayed therein until the printing operation has been completed according to the print command information that was transmitted to the multifunction peripheral 10 in S46.

Next, the operations of the multifunction peripheral 10A, portable terminal 50, and server 110 will be described with reference to FIG. 4 for a case in which the multifunction peripheral 10A executes a printing operation according to the print command information described above. FIG. 4 shows the sequence of steps for a process in which the portable terminal 50 directs the multifunction peripheral 10A to execute a printing operation for recording an image on two sheets of recording paper; a paper jam occurs while recording images on the two sheets of recording paper; and the paper jam is resolved so that the images are successfully recorded on the two sheets of recording paper.

When the terminal program 65 of the portable terminal 50 receives an operation for selecting the "PRINT" icon 127 via the operation interface 54, as described earlier (S11), in S12 the terminal program 65 transmits print command information to the multifunction peripheral 10A via the communication interface 55. For the example of FIG. 4, print command information will be assumed to include the designated data "PHOTO.JPEG," the job ID "001," the paper size "3R," and the number of copies "2". In S13 the terminal program 65 displays the status screen shown in FIG. 9B on the display 53.

Upon receiving the print command information from the portable terminal 50 via the communication interface 25 (S12), the device program 35 of the multifunction peripheral 10A instructs the printer 11 to execute a printing operation based on this print command information. In S14 the printer 11 begins a printing operation to record an image represented by the designated data "PHOTO.JPEG" on the first 3R-size sheet. In S15 the device program 35 generates operation status information that includes the status ID "PRINTING (1/2)" and transmits this operation status information to the server 110 via the communication interface 25. The operation status information generated above also includes the device ID "MFP-A" of the multifunction peripheral 10A, the job ID "001" and terminal ID "abc" included in the print command information, the date information specifying the date and time at which the operation status information was generated, and the priority information "INFO" corresponding to the status ID. This information is also included in subsequent operation status information described later.

The server 110 receives the status information from the multifunction peripheral 10A (S15) and stores this status information in a storage. Further, while not shown in the sequence chart, when the server 110 receives transmission request information from the portable terminal 50, the server 110 determines whether status information including the terminal ID "abc" included in the transmission request information is stored in the storage. If the server 110 determines that status information including this terminal ID "abc" is saved in the storage unit, in S16 the server 110 transmits the status information to the portable terminal 50 in response to the transmission request information.

Note that the server 110 may transmit status information having the oldest date and time specified in its date information to the portable terminal 50 upon determining that information for a plurality of statuses including the same terminal ID are stored in the storage. By returning the status information having the oldest date and time in response to transmission request information repeatedly received from the portable terminal 50, the server 110 can transmit the status information accumulated in the storage to the portable terminal 50 in chronological order. Alternatively, the server 110 may return all status information stored in the storage in response to a single transmission request received from the portable terminal 50.

Figure 10A:
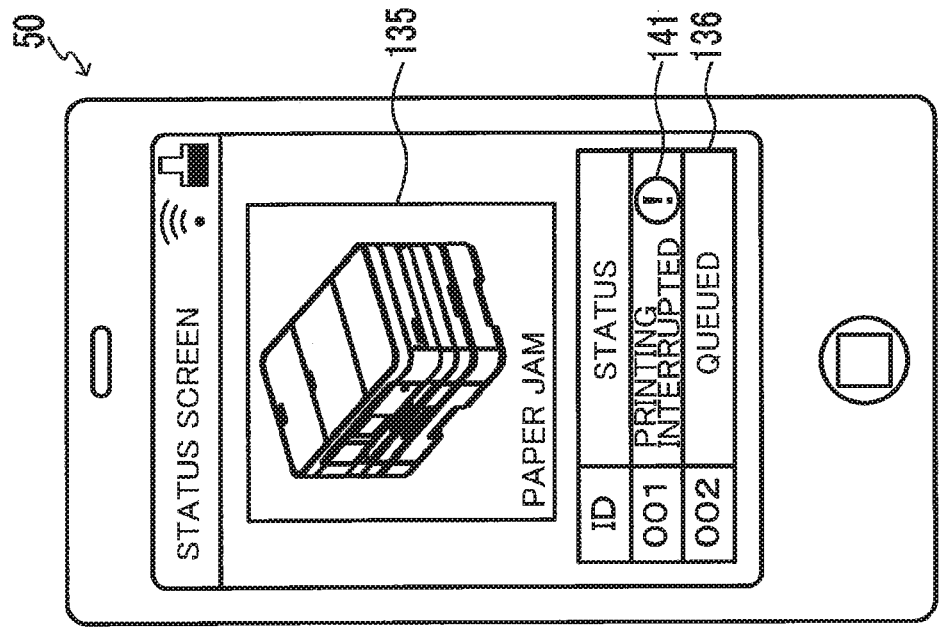
FIG. 10A shows another example of the status screen displayed on the display of the portable terminal.

The terminal program 65 of the portable terminal 50 then receives the status information from the server 110 via the communication interface 55 in response to the transmission request information (S16). In S17 the terminal program 65 updates the status screen with the operation status "PRINTING (1/2)" specified in the status information received in S16. Thus, the terminal program 65 displays the status screen shown in FIG. 10A on the display 53 in place of the status screen shown in FIG. 9B.

Hereafter, processes similar to steps S14-S17 described above are performed on operation status information including the status ID "PRINTING (2/2)" (S18-S21), operation status information including the status ID "PRINTING INTERRUPTED" (S22-S25), operation status information including the status ID "PRINTING RESUMED (2/2)" (S26-S29), and operation status information including the status ID "PRINTING SUCCESSFUL" (S30-S33). Thus, in this example the portable terminal 50 according to the first embodiment receives status information from the server 110 in order of the status records shown in FIG. 3.

Further, in response to the paper jam occurring in S22, the device program 35 of the multifunction peripheral 10 may generate device status information including the status ID "PAPER JAM" in addition to the operation status information including the status ID "PRINTING INTERRUPTED." Similarly, in response to the paper jam being cleared in S26, the device program 35 may generate device status information including the status ID "PAPER JAM CLEARED" in addition to the operation status information including the status ID "PRINTING RESUMED (2/2)." Further, if the device program 35 receives print command information including the job ID "002" from the portable terminal 50 via the communication interface 25 prior to completing the printing operation identified by job ID "001," the device program 35 may generate operation status information including the status ID "QUEUED."

Next, a description will be given of the process performed when the terminal program 65 is unable to receive status information from the server 110 during steps S14-S24 of FIG. 4. The terminal program 65 may be unable to receive status information from the server 110 when the power of the portable terminal 50 is turned off, when the terminal program 65 has been shut down, when communication between the communication interface 55 and router 102A has been interrupted, or when communication between the router 102A and internet 101 has been interrupted, for example. In this description, it will be assumed that the server 110 has accumulated status information including the status IDs "PRINTING (1/2)," "PRINTING (2/2)," "PAPER JAM," "PRINTING INTERRUPTED," and "QUEUED" when communication between the portable terminal 50 and server 110 is restored.

At this time, the terminal program 65 of the portable terminal 50 transmits transmission request information to the server 110 via the communication interface 55 and receives status information from the server 110 via the communication interface 55 (S52: YES). However, rather than immediately executing the status setting process upon receiving the status information, the terminal program 65 again transmits transmission request information to the server 110 via the communication interface 55. In other words, when the terminal program 65 receives status information from the server 110 in S52 while the status screen is displayed on the display 53, the terminal program 65 waits for a prescribed interval to elapse without executing the status setting process while the terminal program 65 is capable of receiving more status information.

More specifically, if the terminal program 65 receives status information during this waiting period after transmitting transmission request information, the terminal program 65 may again transmit transmission request information while not executing the status setting process. However, the terminal program 65 may execute the status setting process if status information is not received during the waiting period after transmitting the transmission request information. That is, the prescribed interval described above may be an interval that varies in length depending on the amount of status information that has accumulated on the server 110. In this way, the terminal program 65 can sequentially receive all status information that has been accumulated on the server 110. Note that this process may be executed each time step S52 is performed or may be executed only when step S52 is performed immediately after communication with the server 110 has been restored.

Next, the status setting process will be described in greater detail with reference to FIG. 6. The terminal program 65 executes the status setting process for each set of status information that includes the same device ID and the same job ID. In other words, the status setting process is executed separately for operation status information that includes the device ID "MFP-A" and the job ID "001," operation status information that includes the device ID "MFP-A" and the job ID "002," and device status information that includes the device ID "MFP-A."

First, in S61 the terminal program 65 determines whether a plurality of sets of status information was received in S52. If the terminal program 65 determines that a plurality of sets of status information was received (S61: YES), in S62 the terminal program 65 determines whether status information including the priority information "WARNING" (designated as "WARNING INFORMATION" in FIG. 6) was received. In other words, the terminal program 65 determines whether suspension status information was received. If suspension status information was received (S62: YES), in S63 the terminal program 65 determines whether the status specified in the suspension status information has already been resolved.

More specifically, the terminal program 65 determines whether resumption status information correlated with the suspension status information has already been received. When such resumption status information has been received, the terminal program 65 determines that the status indicated in the suspension status information has been resolved (S63: YES). However, if such resumption status information has not yet been received, the terminal program 65 determines that the status indicated in the suspension status information has not been resolved (S63: NO).

When the status specified in the suspension status information has not been resolved (S63: NO), in S64 the terminal program 65 sets target status information to this suspension status information. However, if the status indicated by the suspension status information has been resolved (S63: YES), in S65 the terminal program 65 removes this status information from the possible candidates for the target status information, returns to S62, and repeats the process described above. In other words, when the status indicated by the suspension status information has been resolved (S63: YES), the terminal program 65 sets the target status information to status information other than this suspension status information.

Further, if the terminal program 65 determines that status information including the priority information "WARNING" has not been received (S62: NO), in S66 the terminal program 65 identifies what status information with the priority information "INFO" (designated as "INFO INFOMRATION" in FIG. 6) has date information indicating the most recent date and time. In S67 the terminal program 65 determines whether the status information identified in S66 is within its period of validity. The period of validity may be included in the status information or may be stored by the terminal program 65 in advance in association with the corresponding status ID or priority information.

If the terminal program 65 determines in S67 that the status information identified in S66 falls within its period of validity (S67: YES), in S68 the terminal program 65 sets the target status information to this status information. However, if the terminal program 65 determines that the period of validity for the status information identified in S66 has expired (S67: NO), in S69 the terminal program 65 removes this status information from the candidates for the target status information, returns to S66, and repeats the process described above. Thus, the terminal program 65 will set the target status information to status information other than that whose period of validity has expired.

Further, if the terminal program 65 determines in S61 that only one set of status information was received in S52 (S61: NO), in S70 the terminal program 65 sets the target status information to this status information. In other words, when only one set of status information was received in a single status receiving process (S52), the terminal program 65 sets the target status information to this status information in the status setting process (S53).

Figure 10B:
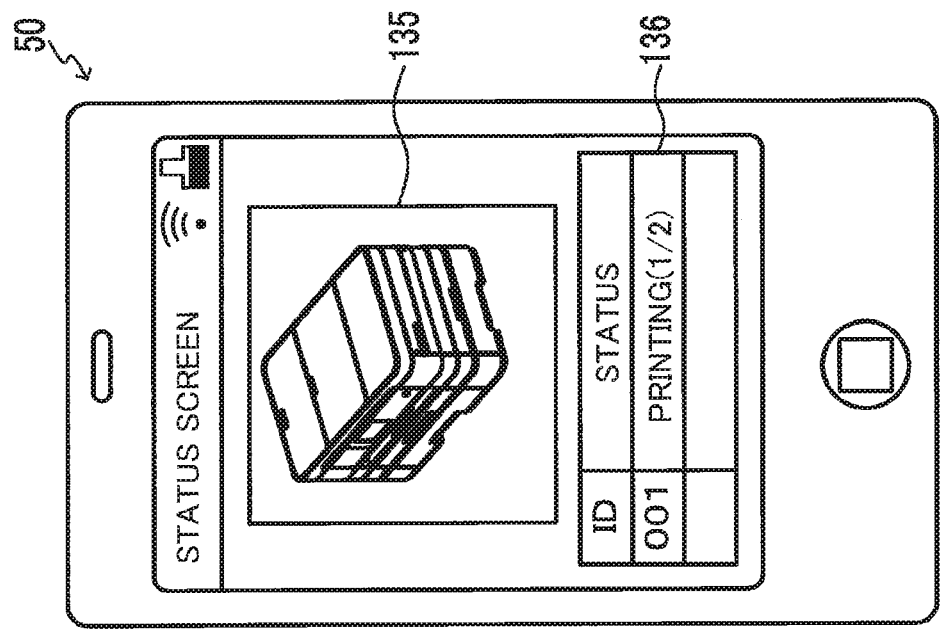
FIG. 10B shows yet another example of the status screen displayed on the display of the portable terminal.

Since the status setting process is performed three times in this example, the target status information is set to operation status information including the device ID "MFP-A," the job ID "001," and the status ID "PRINTING INTERRUPTED"; operation status information including the device ID "MFP-A," the job ID "002," and the status ID "QUEUED"; and device status information including the device ID "MFP-A" and the status ID "PAPER JAM." In S47 the terminal program 65 displays a status screen including the status specified in the target status information on the display 53, as shown in the example of FIG. 10B.

In the status screen shown in FIG. 10B, the status "PAPER JAM" is displayed in the device status display area 135, and the job IDs "001" and "002" and their corresponding statuses "PRINTING INTERRUPTED" and "QUEUED" are displayed in the operation status display area 136. The terminal program 65 also displays a "!" icon 141 in the status screen next to the set of target status information having the job ID "001" and the status "PRINTING INTERRUPTED." The "!" icon 141 is an example of the claimed list object corresponding to a command to display a list of statuses indicated in a plurality of sets of status information that include the job ID "001."

If the terminal program 65 receives an operation via the operation interface 54 to select the "!" icon 141 (S48: YES), in S51 the terminal program 65 displays a status list screen on the display 53. The status list screen presents a list of statuses specified by status information that were candidates for target status information in S53 and that include the job ID associated with the "!" icon 141. The user operation for selecting the "!" icon 141 via the operation interface 54 is an example of the claimed designation operation.

FIG. 11A shows an example of the status list screen. The status list screen shown in FIG. 11A includes statuses "PRINTING (1/2)," "PRINTING (2/2)," and "PRINTING INTERRUPTED"; and a "RETURN" icon 142. In the example of FIG. 11A, the status list screen displays the date and time indicated in the date information and the priority indicated in the priority information in association with the corresponding status, but the items displayed in the status list screen are not limited to these items. When the terminal program 65 receives an operation via the operation interface 54 to select the "RETURN" icon 142 in the status list screen, in S47 the terminal program 65 redisplays the status screen on the display 53.

[Operational Advantages of the First Embodiment]

In the status setting process of the first embodiment described above, suspension status information that has already been resolved and status information whose period of validity has expired are excluded as candidates for the target status information when a plurality of sets of status information were received in a single status receiving process. If there exists suspension status information that has not been cleared, that suspension status information is set as the target status information. On the other hand, when there is no status information having the priority information "Warning," the target status information is set to the most recent status information having the priority information "Info."

Through this process, the target status information can be set to the status information specifying a status that is useful for the user of the portable terminal 50. Only statuses indicated in the status information received from the server 110 that need to be presented to the user of the portable terminal 50 are selectively displayed in the status screen. Hence, the user of the portable terminal 50 can be suitably notified of the status of the multifunction peripheral 10. However, the method of setting the target status information in the status setting process is not limited to the example in FIG. 6.

The first embodiment described above can present the statuses indicated by the operation status information and the device status information separately from each other, and can present the operation status indicated in the operation status information for each job ID. Thus, the user of the portable terminal 50 can be suitably notified about the progress of the image-related operation for each job ID, and the status of the multifunction peripheral 10 that is shared by the plurality of jobs.

In the first embodiment, the status setting process is not immediately executed when a single set of status information is received in the status receiving process. In this way, the portable terminal 50 can receive a plurality of sets of status information accumulated on the server 110 altogether at a specific timing, such as when the status of communications with the server 110 changes from unconnected to connected, and can selectively notify the user only of statuses that would be useful. In this way, the portable terminal 50 does not bombard the user with rapid and confusing updates to the status screen.

When target status information is set to one of a plurality of sets of status information in the first embodiment described above, the terminal program 65 includes the "!" icon 141 in the status screen next to the status indicated in this target status information. If the user selects the "!" icon 141, the terminal program 65 displays a list of the statuses indicated by the plurality of sets of status information that were candidates for the corresponding target status information. In this way, the user of the portable terminal 50 can view the sequence of events that led to the status currently displayed in the status screen.

The first embodiment describes an example in which status records specifying status information received in step S52 are added to a status list, and only one set of status information in the status list is set as the target status information. However, the timing for the process performed in steps S52 and S53 is not limited to the first embodiment. For example, the terminal program 65 may execute the status setting process each time status information is received in S52. In this case, the terminal program 65 may add only the status record representing the target status information to the status list from among the plurality of sets of status information selected as candidates for target status information. In other words, the status list may be overwritten in the status setting process.

The form of the device icons 131 and 132 displayed in the device selection screen in S54 may also be modified based on the device status information included in the status list. For example, the terminal program 65 may determine whether any of the status records in the status list having the device ID of the detected multifunction peripherals 10A and 10B includes a status ID indicating that an image-related operation cannot be executed. Status IDs that indicate image-related operations are not possible include "PAPER JAM," "OUT OF PAPER," and "OUT OF INK," for example.

When the terminal program 65 determines that there are no status records in the status list with a status ID indicating that image-related operations cannot be executed, the terminal program 65 may display the device icons in a form that can be selected through the operation interface 54. On the other hand, if the terminal program 65 determines that a status record includes a status ID indicating that image-related operations cannot be executed, the terminal program 65 may display the corresponding device icon in a form that cannot be selected through the operation interface 54 (in a grayed-out form, for example).

The image-related operations executed on the multifunction peripheral 10 by the terminal program 65 are not limited to printing operations, but may include scanning operations, faxing operations, and copying operations, for example. The operation status in a scanning operation would include such statuses as "SCANNING (xth SHEET)" indicating that the xth sheet of an original is being scanned, and "PAPER JAM" indicating that the original has jammed in the automatic document feeder (ADF; not shown). The operation status of a faxing operation would include "DIALING" indicating that a call has been placed to an external device, "TRANS- MITTING (xth PAGE)" indicating that image data for the xth page is being transmitted, and "RECEIVING" indicating that image data is being received. The operation statuses in a copying operation may be similar to the operation statuses used in scanning operations and printing operations, for example.

[Second Embodiment]

Figure 7:
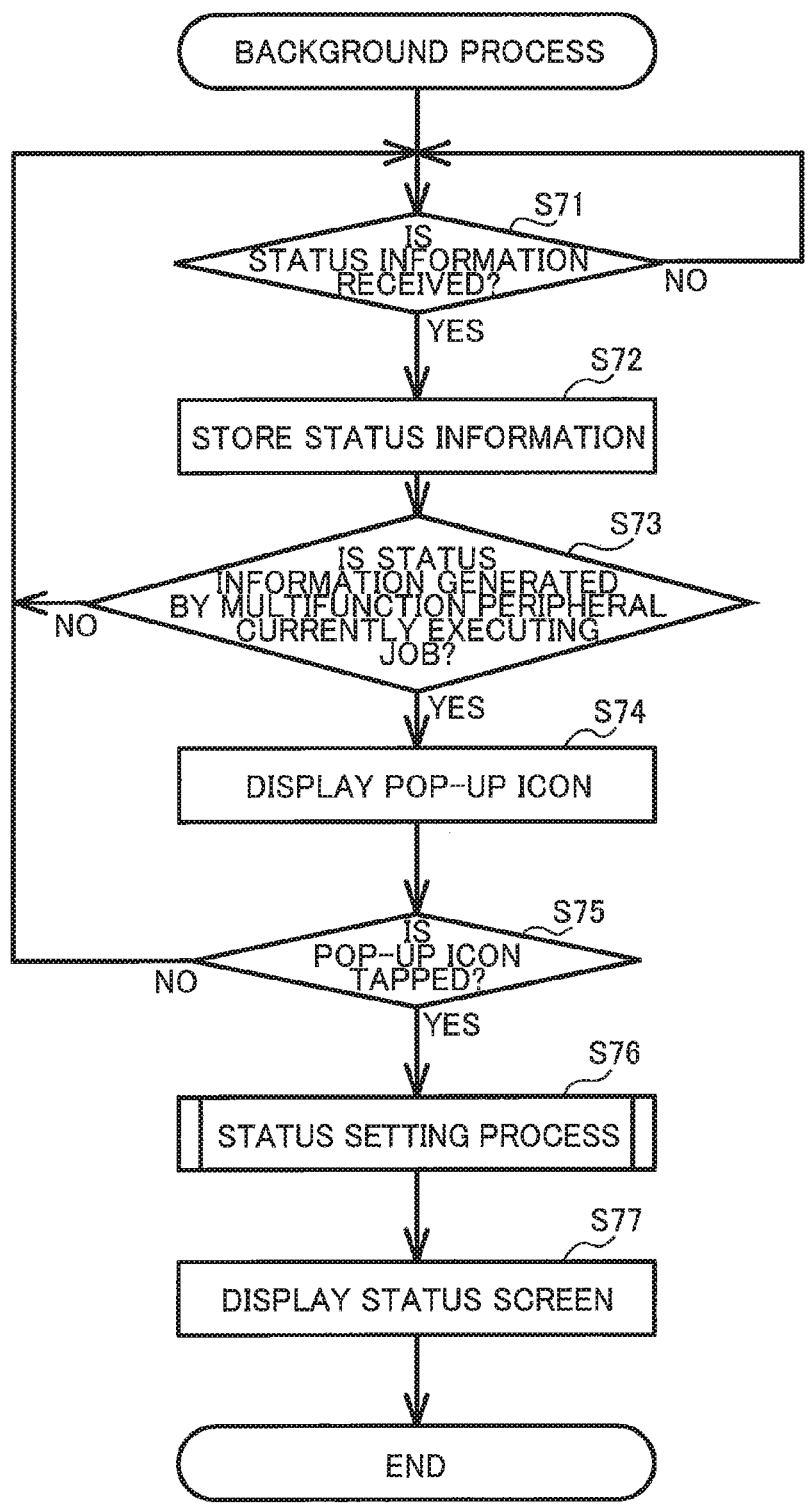
FIG. 7 is a flowchart illustrating steps in a background process executed by the portable terminal.

Setting a target status in the status setting process is not limited to cases in which the portable terminal 50 and server 110 cannot communicate with each other. Here, the operations of the monitoring system 100 according to a second embodiment will be described with reference to FIG. 7. The following description will focus on differences from the first embodiment while omitting a detailed description of points common to the first embodiment. The process shown in FIG. 7 is executed by the terminal program 65 in the background.

First, it is assumed that the OS 64 of the portable terminal 50 has started the terminal program 65 in the background and that the menu screen is displayed on the display 53. FIG. 11B shows an example of the menu screen. The menu screen shown in FIG. 11B includes a plurality of program icons 151, 152, 153, 154, and 155. The program icons 151-155 correspond to programs that are installed on the portable terminal 50. For example, the program icon 155 corresponds to the terminal program 65. When the OS 64 receives an operation via the operation interface 54 for selecting one of the program icons 151-155, the OS 64 executes the program corresponding to the selected program icon in the foreground. Note that a pop-up icon 156 shown in FIG. 11B has not yet been displayed at this point.

In the meantime, in S71 the terminal program 65 running in the background is monitoring whether status information has been received from the server 110 via the communication interface 55. That is, even when executing in the background, the terminal program 65 repeatedly transmits transmission request information to the server 110 via the communication interface 55 at prescribed intervals. When status information is received from the server 110 via the communication interface 55 (S71: YES), in S72 the terminal program 65 adds a status record specifying the status information received in S71 to the status list.

In S73 the terminal program 65 determines whether the status information received in S71 was generated by a multifunction peripheral 10 currently executing an image-related operation directed by the portable terminal 50. More specifically, the terminal program 65 identifies the device ID in the status information received in S71 and determines whether the status list includes a status record having the identified device ID.

If the terminal program 65 determines that the status list includes a status record having the identified device ID (S73: YES), in S74 the terminal program 65 displays the pop-up icon 156 in the menu screen, as illustrated in the example of FIG. 11B. The pop-up icon 156 includes a message such as "YOU HAVE 3 NEW MESSAGES FROM MFP-A." The pop-up icon 156 is an example of the claimed notification object for notifying the user that status information has been received. The pop-up icon 156 also corresponds to a command for displaying the status screen.

Here, the pop-up icon 156 may be a pop-up message that appears above the bottom edge of the display area in the display 53; a head-up message that appears below the top edge of the display area; a toast message that appears in the center of the display area and automatically disappears after a prescribed interval; or a dialog box that includes an icon for receiving a user operation indicating that the message has been confirmed and that disappears when the icon is selected. All of these types of messages are examples of the claimed pop-up display.

Next, the terminal program 65 determines in S75 whether an operation to select the pop-up icon 156 was received via the operation interface 54. If an operation to select the pop-up icon 156 was received (S75: YES), in S76 the terminal program 65 executes the status setting process and in S77 displays the status screen in the foreground on the display 53. The user operation for selecting the pop-up icon 156 via the operation interface 54 is an example of the claimed display command operation for displaying the status screen. The process performed in step S76 may be identical to that in step S53 of the first embodiment, and the process in step S77 may be identical to that in step S47. Here, the status setting process in S76 sets the target status information to a set of status information received from the server 110 while the terminal program 65 was running in the background.

Figure 5:
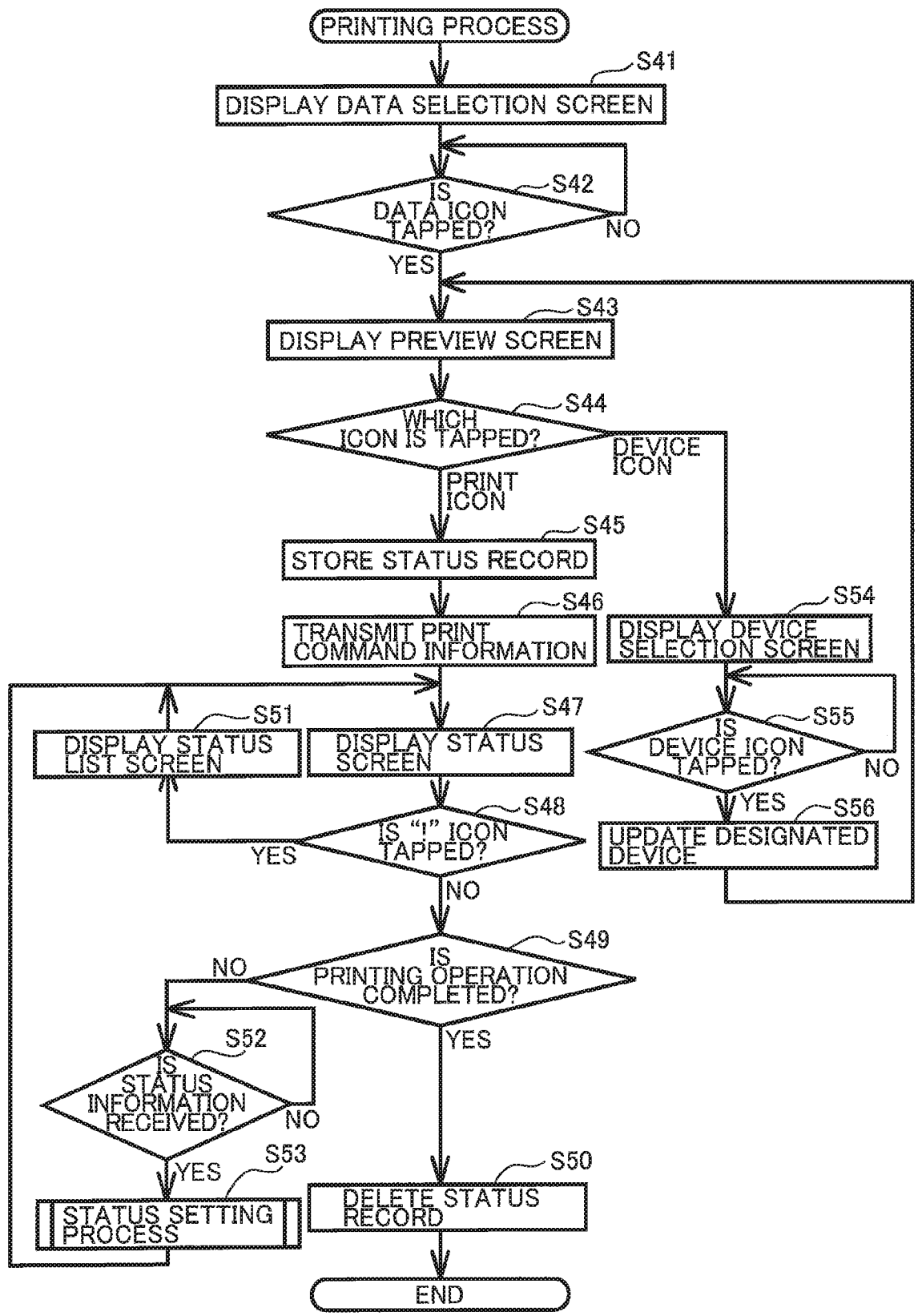
FIG. 5 is a flowchart illustrating steps in a printing process executed by the portable terminal.
Figure 6:
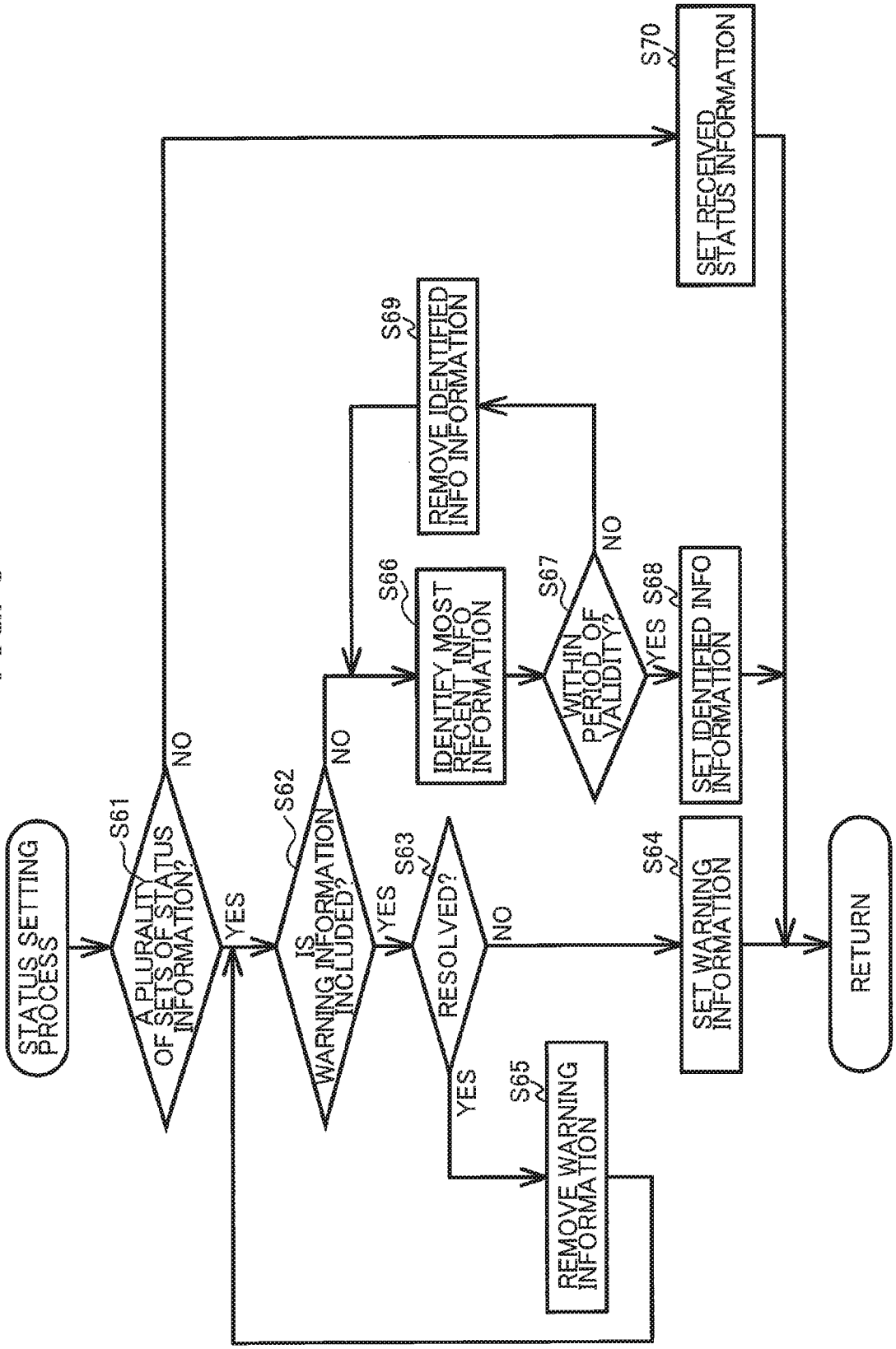
FIG. 6 is a flowchart illustrating steps in a status setting process executed by the portable terminal.

Thereafter, the terminal program 65 executes the process beginning from S48 of FIG. 5 while running in the foreground. On the other hand, if the terminal program 65 determines that the status list does not include a status record having the identified device ID (S73: NO) or if the terminal program 65 does not receive an operation via the operation interface 54 to select the pop-up icon 156 before a prescribed notification time has elapsed since the pop-up icon 156 was displayed (S75: NO), the terminal program 65 returns to S71 and again monitors the communication interface 55 for status information received from the server 110.

[Operational Advantages of the Second Embodiment]

The second embodiment described above can notify the user of the portable terminal 50 of only such statuses that are useful from among the plurality of sets of status information received while the terminal program 65 was running in the background. The pop-up icon 156 notifies the user when status information has been received, and the user can display the status screen by selecting the pop-up icon 156. Accordingly, this method facilitates the user in accessing a status specified by received status information.

In the second embodiment, the pop-up icon 156 is only displayed when status information is received from the multifunction peripheral 10A executing an image-related operation under control of the portable terminal 50. In other words, the pop-up icon 156 is not displayed when device status information including the status ID "OUT OF INK" is received from the multifunction peripheral 10B to which the portable terminal 50 has not sent image-related command information, for example. By not notifying the user of the portable terminal 50 regarding the reception of status information having low urgency, this method can reduce interruptions to the user's activity.

Note that the process shown in FIG. 7 is not limited to being executed while the terminal program 65 is running in the background. For example, the process shown in FIG. 7 may be executed while the terminal program 65 is running in the foreground, even when the terminal program 65 is displaying screens other than the status screen, such as the data selection screen or preview screen.

In the multifunction peripheral 10 and portable terminal 50 of the embodiments described above, the corresponding CPUs 31 and 61 execute the programs stored in the program storage areas 32A and 62A of the corresponding storage 32 and 62 as an example of the controller in the present disclosure implementing processes. However, the configuration of the controller in the present disclosure is not limited to this example. All or part of the controller configuration may be implemented in hardware, such as integrated circuits (IC).

Further, the present disclosure is not limited to an implementation using the multifunction peripheral 10 and portable terminal 50, but may be implemented as a program that controls the multifunction peripheral 10 and portable terminal 50 to execute processes. Further, this program may be recorded on a non-transitory recording medium to be supplied to the user. Non-transitory recording media may include a CD-ROM, a DVD-ROM, or a storage provided in a server that can connect to the multifunction peripheral 10 and portable terminal 50 via a communication network. The program stored in the storage of the server may be distributed over a communication network such as the internet as information or signals specifying the program.

What is claimed is:

1. A non-transitory computer readable storage medium storing a set of program instructions for controlling an information-processing terminal, the information-processing terminal comprising: a first communication interface configured to communicate with an image-processing device and a push notification server; an operation interface configured to receive a user operation; a display; and a first controller, the image-processing device comprising: a second communication interface configured to communicate with the information-processing terminal and the push notification server; an image-processor; and a second controller configured to control the image-processor to execute an image-processing operation and transmit status information indicative of status of the image-processing device or the image-processing operation to the push notification server via the second communication interface, the program instructions, when executed by the first controller, causing the information-processing terminal to perform:
    (a) receiving a user input for instructing the image-processing device to execute the image-processing operation via the operation interface;
    (b) transmitting input information to the image-processing device via the first communication interface in response to receiving the user input, the input information instructing the image-processing device to execute the image-processing operation;
    (c) receiving status information from the push notification server via the first communication interface, the status information being indicative of status of the image-processing device that executes the image-processing operation according to the input information;
    (d) determining, in response to receiving the status information, whether the status information is within a period of validity; and
    (e) displaying a status screen including the status on the display in a case where the (d) determining determines that the status information, which is received from the push notification server, is within the period of validity, and not displaying a status screen including the status on the display in a case where the (d) determining determines that the status information, which is received from the push notification server, is not within the period of validity.

2. The non-transitory computer readable storage medium according to claim 1,
    wherein the status information includes date information specifying date and time, and
    wherein the (d) determining determines whether the date and time specified by the date information is within the period of validity.

3. The non-transitory computer readable storage medium according to claim 2, wherein the date information specifies date and time that the image-processing device generates the status information.

4. The non-transitory computer readable storage medium according to claim 2, wherein the date information specifies date and time that the push notification server receives the status information from the image-processing device.

5. The non-transitory computer readable storage medium according to claim 2, wherein the date information specifies date and time that the push notification server transmits the status information to the information-processing terminal.

6. The non-transitory computer readable storage medium according to claim 1, wherein the program instructions further cause the information-processing terminal to perform:
    (f) determining whether suspension status information is included in the status information, the suspension status information indicating that the image-processing operation has been suspended,
    wherein the (d) determining is skipped in response to determining that the suspension status information is included in the status information.

7. The non-transitory computer readable storage medium according to claim 6, wherein the program instructions further cause the information-processing terminal to perform:
    (g) determining, in response to determining that the suspension status information is included in the status information, whether resumption status information is further included in the status information, the resumption status information indicating that the suspended image-processing operation has been resumed,
    wherein the statuses based on the suspension status information and the resumption status information are not displayed in response to determining that the resumption status information is included in the status information.

8. An information-processing terminal comprising:
    a communication interface configured to communicate with an image-processing device and a push notification server, the image-processing device configured to execute an image-processing operation and transmit status information indicative of status of the image-processing device or the image-processing operation to the push notification server;
    an operation interface configured to receive a user operation;
    a display; and
    a controller configured to perform:
        receiving a user input for instructing the image-processing device to execute the image-processing operation via the operation interface;
        transmitting input information to the image-processing device via the communication interface in response to receiving the user input, the input information instructing the image-processing device to execute the image-processing operation;
        receiving status information from the push notification server via the communication interface, the status information being indicative of status of the image-processing device that executes the image-processing operation according to the input information;
        determining, in response to receiving the status information, whether the status information is within a period of validity; and displaying a status screen including the status on the display in a case where the determining determines that the status information, which is received from the push notification server, is within the period of validity, and not displaying a status screen including the status on the display in a case where the determining determines that the status information, which is received from the push notification server, is not within the period of validity.

9. A system comprising an information-processing terminal and an image-processing device,
the image-processing device comprising:
a first communication interface configured to communicate with the information-processing terminal and a push notification server;
an image-processor; and
a first controller configured to perform:
receiving input information from the information-processing terminal via the first communication interface;
controlling the image-processor to execute an image-processing operation according to the input information; and
transmitting status information indicative of status of the image-processing device that executes the image-processing operation according to the input information to the push notification server via the first communication interface,
the information-processing terminal comprising:
a second communication interface configured to communicate with the image-processing device and the push notification server;
an operation interface configured to receive a user operation;
a display; and
a second controller configured to perform:
receiving a user input for instructing the image-processing device to execute an image-processing operation via the operation interface;
transmitting the input information to the image-processing device via the second communication interface in response to receiving the user input;
receiving status information from the push notification server via the second communication interface, the status information being indicative of status of the image-processing device that executes the image-processing operation according to the input information;
determining, in response to receiving the status information, whether the status information is within a period of validity; and
displaying a status screen including the status on the display in a case where the determining determines that the status information, which is received from the push notification server, is within the period of validity, and not displaying a status screen including the status on the display in a case where the determining determines that the status information, which is received from the push notification server, is not within the period of validity.

* * * * *